June 19, 1934. W. JOURDAN 1,963,235
METHOD FOR PRODUCING COMPACT PARCELS OF MEAT
Filed Oct. 22, 1932
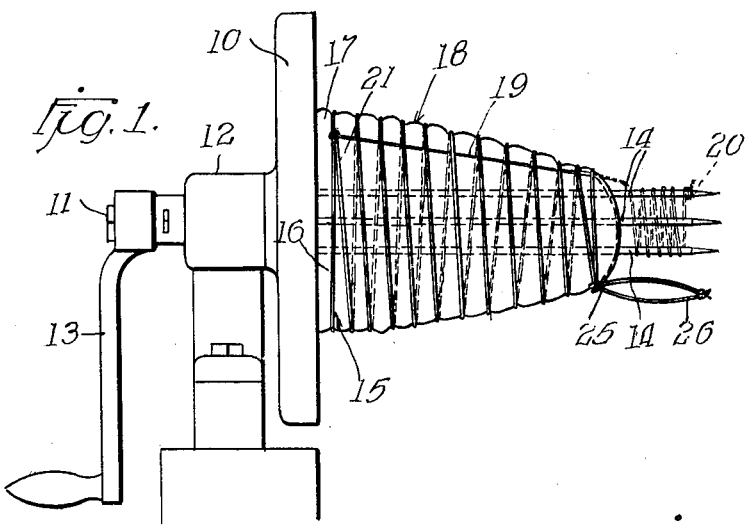
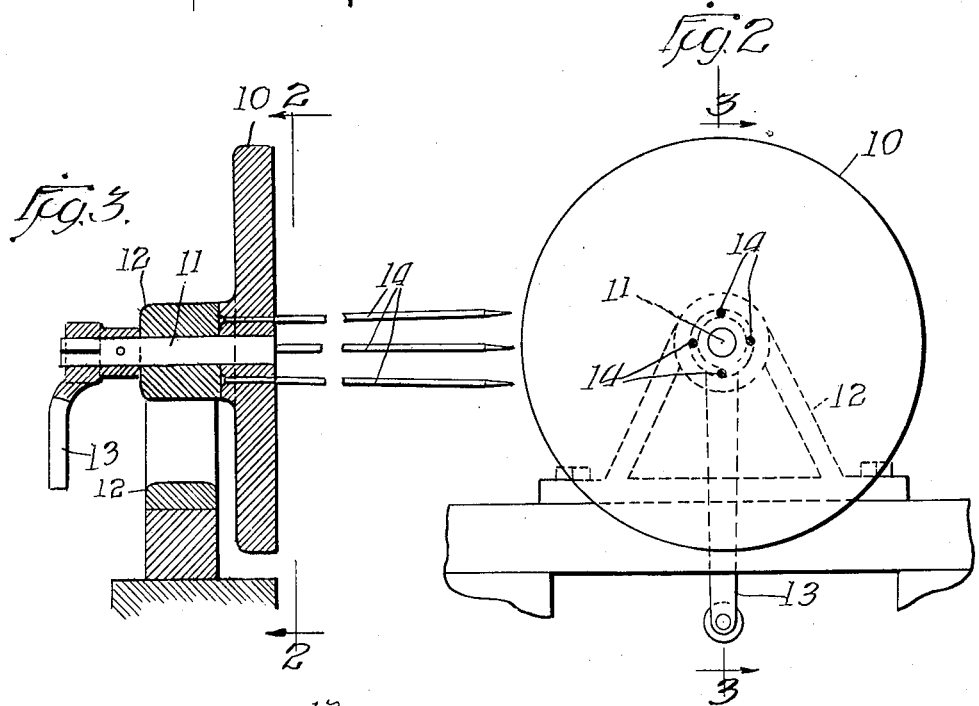
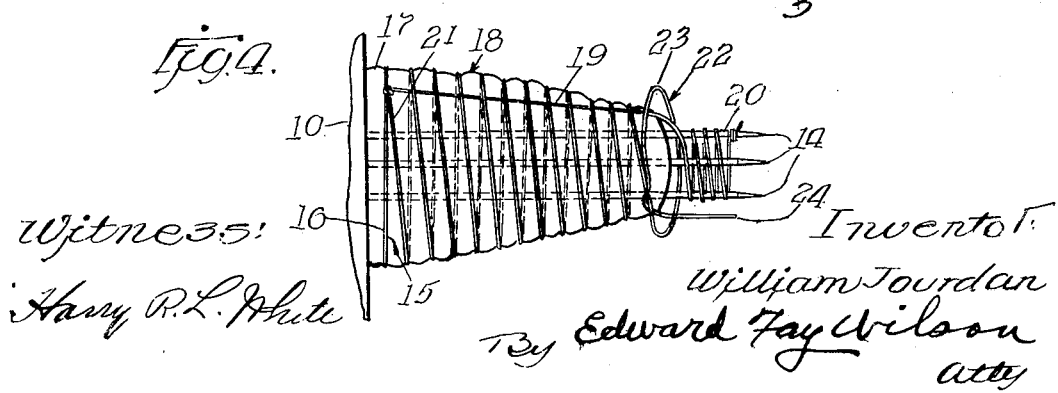

Patented June 19, 1934

1,963,235

UNITED STATES PATENT OFFICE 1,963,235

METHOD FOR PRODUCING COMPACT PARCELS OF MEAT

William Jourdan, Chicago, Ill.

Application October 22, 1932, Serial No. 639,090

2 Claims. (Cl. 17—45)

This invention relates to improvements in means and methods for producing compact boneless masses or parcels of meat out of parts or portions which are not compact.

It has long been the custom to partly cure pieces of pork to produce ham and then form the pieces into compact masses by means of string and then complete the curing, producing what is popularly known as boneless ham.

There are some parts of pork which it has been difficult to wrap or tie up into a compact mass, such for instance as the shoulder part from which the bones have been removed, leaving a mass, which when compacted will be cone-shaped. Other parts, such as the tenderloin, are small, and it has been, so far, almost impossible to form a mass suitable for later slicing, out of such pieces.

By means of my invention I am enabled to form compact masses out of substantially any sizes or shapes of pieces; I am enabled to very greatly reduce the time necessary for making such masses and to produce masses of good appearance, and generally to reduce the cost of such products.

To the accomplishment of the above and associated ends, the invention consists in the methods of procedure and in the arrangements of parts and devices hereinafter fully described and particularly pointed out in the appended claims, the accompanying drawing forming part of this specification, and the following description setting forth in detail one embodiment exemplifying the invention. Such disclosed method and arrangement of parts and devices constituting, however, but one of the various applications of the principle of the invention.

Referring to said drawing:—

Fig. 1 is a side elevation of a machine for the production of compacted meat bodies, a meat body being shown on the machine, in its finished form;

Fig. 2 is a vertical section on the line 2—2 of Fig. 3;

Fig. 3 is a fragmentary vertical section on the line 3—3 of Fig. 2; and

Fig. 4 is a fragmentary side elevation similar to Fig. 1, but illustrating the method of securing the free end of the compacting cord.

In said drawing 10 is a rotatably-mounted base plate preferably circular in form. The base 10 is secured on one end of a horizontally-arranged shaft 11 which is mounted for rotation in a fixed bearing 12. A crank 13 is secured to the opposite end of the shaft and by which the base can be readily rotated.

A plurality of relatively-long needle-like prongs or projections 14 are each rigidly secured at one end to the base plate 10. These prongs 14 are arranged near the center of the base plate and are preferably arranged equidistant from the axial center thereof. As shown in Fig. 3, the prongs 14 are inclined slightly outwardly, their outer or free ends being somewhat more widely separated than their inner or fixed ends. The prongs 14 are preferably made of spring steel so that while they are slightly yielding they are also relatively stiff.

In using the machine to form compact parcels of meat, the meat, which may consist of one irregular piece or a number of pieces as may be desired, is forced upon the prongs, being impaled on the outer or free ends of the prongs and forced along the prongs to and against the base plate 10. Preferably before the meat is forced onto the prongs the larger end of the mass is tied together by a binding or compacting cord 15, preferably one turn 16 of the cord being tied tightly around the base or larger part 17 of the meat 18. This preliminary tying together of the one end of the mass of meat helps in the placing of the meat upon the prongs.

As the meat is forced along the prongs toward the base 10 the inclination of the prongs tends to compress and compact the meat between them.

The parcel of meat 18 shown in the drawing may represent a shoulder portion, from which the bones have been removed and which, when compacted takes a conical form as shown.

In binding the base portion of the mass of meat together by the secured turn 16 of the cord 15, one end 19 of the cord is left long enough to be drawn down along the mass of meat 18 and be temporarily secured to the free ends of the prongs 14 as shown at 20. This part of the cord is preferably drawn down into the mass of meat, preferably between contacting parts thereof.

In temporarily securing the end 19 of the cord around the projections, as shown at 20, the cord is preferably drawn rather tight, thus drawing the projections together and compressing the meat which lies between them.

The other portion 21 of the cord 15 is then wound tightly around the mass of meat in a spiral form as shown, the base 10 and the mass of meat being rotated by the crank 13 during this operation and the cord being held by hand with sufficient tension to cause it to sink into the body of meat and tightly compact it.

In winding the portion 21 of the cord around the meat as shown it is preferably drawn tight enough so that the compressing or compacting action reaches clear to the center, thus assisting the needle-like projections in compacting the center portion of the mass.

It will be noticed that as the needles 14 are buried in the mass of meat they do not interfere in any way with the application of the compacting cord.

Adjacent to the free end of the mass of meat the free end 22 of the part 21 of the cord is secured in position by one or more loops 23 in the form of half-hitches, the free end 24 being preferably secured at the side opposite to that where the first end 19 emerges.

This end 19 is then drawn tightly across the free end of the compacted mass of meat and is tied tightly to the free end 24 of the compacting cord 21 as shown at 25.

Thereafter a suspending loop 26 may be formed of the two ends of the cord.

When the parcel of meat is completed, the projections 14 being imbedded in the mass and being held in substantially parallel relation, the parcel is easily pulled off of the projections, and is ready for the next curing step.

As many modifications of the invention will readily suggest themselves to one skilled in the art, I do not limit or confine the invention to the specific details of operation or construction herein shown and described.

I claim:

1. The herein described method of making a compact parcel of meat out of more or less disconnected parts, which consists in securing a compacting cord to one part of the meat to be compacted, leaving both ends of the cord free, impaling and packing the meat on a number of outwardly flared needle-like, resilient projections and against a base with the secured portion of the cord adjacent to said base, one free end of the compacting cord being temporarily secured at the end of the parcel opposite the ball around the free ends of the projections with sufficient tension to draw the projections in into parallelism, winding the other free end portion of the cord separately and tightly around the parcel from the base end to the opposite end, securing said last end of the cord to said opposite end of the parcel, and withdrawing the parcel from said needle-like projections.

2. In the herein described method of forming a compact parcel of meat out of more or less disconnected parts, the step of impaling the meat on a set of resilient, needle-like projections which are arranged in slightly flared relation and by which the center portion of the meat is compacted to some extent and further compacting the center portion of the parcel by drawing the free ends of the needle-like projections in toward each other to cause same to lie in parallel relation, and whereby the finished parcel can be readily withdrawn from the projections without disturbing the center portion thereof.

WILLIAM JOURDAN.